United States Patent
Lin et al.

(10) Patent No.: US 11,500,981 B2
(45) Date of Patent: *Nov. 15, 2022

(54) SHADOW STACK ENFORCEMENT RANGE FOR DYNAMIC CODE

(71) Applicant: Microsoft Technology Licensing, LLC, Redmond, WA (US)

(72) Inventors: Jin Lin, Seattle, WA (US); Jason Lin, Bellevue, WA (US); Niraj Majmudar, Renton, WA (US); Mehmet Iyigun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/945,458

(22) Filed: Jul. 31, 2020

(65) Prior Publication Data

US 2021/0303681 A1 Sep. 30, 2021

Related U.S. Application Data

(63) Continuation-in-part of application No. 16/828,089, filed on Mar. 24, 2020, now Pat. No. 11,379,579.

(51) Int. Cl.
*G06F 21/00* (2013.01)
*G06F 21/54* (2013.01)
(Continued)

(52) U.S. Cl.
CPC .......... *G06F 21/54* (2013.01); *G06F 9/44521* (2013.01); *G06F 9/485* (2013.01); *G06F 2221/033* (2013.01)

(58) Field of Classification Search
None
See application file for complete search history.

(56) References Cited

U.S. PATENT DOCUMENTS

| 2005/0010804 | A1* | 1/2005 | Bruening | G06F 21/52 |
| | | | | 726/1 |
| 2007/0192576 | A1 | 8/2007 | Moore et al. | |

(Continued)

OTHER PUBLICATIONS

Burow, Nathan et al. SoK: Shining Light on Shadow Stacks. 2019 IEEE Symposium on Security and Privacy (SP). https://ieeexplore.ieee.org/stamp/stamp.jsp?tp=&arnumber=8835389 (Year: 2019).*

(Continued)

*Primary Examiner* — Jeremiah L Avery
(74) *Attorney, Agent, or Firm* — Workman Nydegger

(57) ABSTRACT

Enforcing shadow stack violations for dynamic code. A thread is executed at a processor, which includes generating a portion of dynamic code for execution by the thread, identifying a range of memory addresses where the portion of dynamic code is loaded in memory, and initiating execution of the portion of dynamic code. Based at least on execution of the thread, an exception triggered by a mismatch between a first return address popped from a call stack corresponding to the thread and a second return address popped from a shadow stack corresponding to the thread is processed. Processing the exception includes (i) determining whether the second return address popped from the shadow stack is within the identified range of addresses, and (ii) based on having determined that the second return address is within the range of addresses, initiating a shadow stack enforcement action.

20 Claims, 8 Drawing Sheets

(51) Int. Cl.
   *G06F 9/445* (2018.01)
   *G06F 9/48* (2006.01)

(56) References Cited

U.S. PATENT DOCUMENTS

| | | | |
|---|---|---|---|
| 2009/0320129 | A1 | 12/2009 | Pan et al. |
| 2015/0356294 | A1* | 12/2015 | Tan .................... G06F 21/53 726/22 |
| 2016/0092673 | A1* | 3/2016 | LeMay .................. G06F 21/52 718/1 |
| 2017/0228535 | A1* | 8/2017 | Shanbhogue ........... G06F 9/461 |
| 2020/0125770 | A1* | 4/2020 | LeMay .................. G06F 21/72 |
| 2020/0159888 | A1* | 5/2020 | Ghose ................... G06F 9/3842 |
| 2021/0200546 | A1* | 7/2021 | LeMay ............... G06F 9/45558 |
| 2021/0303680 | A1 | 9/2021 | Lin et al. |
| 2021/0311740 | A1 | 10/2021 | Lin et al. |

OTHER PUBLICATIONS

Panis, C. et al. Scaleable shadow stack for a configurable DSP concept. Proceedings of the 3rd IEEE International Workshop on System-on-Chip for Real-Time Applications, 2003. https://ieeexplore.ieee.org/stamp/stamp.jsp?tp=&arnumber=1213039 (Year: 2003).*

Bresch, Cyril et al. Stack Redundancy to Thwart Return Oriented Programming in Embedded Systems. IEEE Embedded Systems Letters, vol. 10, Issue: 3. https://ieeexplore.ieee.org/stamp/stamp.jsp?tp=&arnumber=8326545 (Year: 2018).*

"Multiple Chinese Threat Groups Exploiting CVE-2018-0798 Equation Editor Vulnerability Since Late 2018", Retreived From: https://www.anomali.com/blog/multiple-chinese-threat-groups-exploiting-cve-2018-0798-equation-editor-vulnerability-since-late-2018, Jul. 3, 2019, 10 Pages.

Branscombe, Mary, "Windows 10 Security: How the Shadow Stack Will Help to Keep the Hackers at Bay", Retreived From: https://www.techrepublic.com/article/windows-10-security-how-the-shadow-stack-will-help-to-keep-the-hackers-at-bay/, Apr. 3, 2020, 7 Pages.

Bridge, et al., "PE Format", Retrieved From: https://docs.microsoft.com/en-us/windows/win32/debug/pe-format#extended-dll-characteristics, Aug. 11, 2020, 57 Pages.

Pulapaka, Hari, "Understanding Hardware-enforced Stack Protection", Retrieved From: https://techcommunity.microsoft.com/t5/windows-kernel-internals/understanding-hardware-enforced-stack-protection/ba-p/1247815, Mar. 24, 2020, 6 Pages.

Robertson, et al., "/CETCOMPAT (CET Shadow Stack Compatible)", Retrieved From: https://docs.microsoft.com/en-us/cpp/build/reference/cetcompat?view=msvc-160&viewFallbackFrom=vs-2019, Sep. 1, 2020, 3 Pages.

Robertson, et al., "/NXCOMPAT (Compatible with Data Execution Prevention)", Retrieved From: https://docs.microsoft.com/en-us/cpp/build/reference/nxcompat-compatible-with-data-execution-prevention?view=msvc-160&viewFallbackFrom=vs-2019, Dec. 17, 2019, 2 Pages.

Swiat, "Eternal Champion Exploit Analysis", Retrieved From: https://msrc-blog.microsoft.com/2017/06/29/eternal-champion-exploit-analysis/, Jun. 29, 2017, 13 Pages.

"International Search Report and Written Opinion Issued in PCT Application No. PCT/US21/015349", dated Apr. 22, 2021, 13 Pages.

"International Search Report and Written Opinion Issued in PCT Application No. PCT/US21/015973", dated Apr. 26, 2021, 14 Pages.

Zhang, et al., "JITScope: Protecting Web Users from Control-Flow Hijacking Attacks", In Proceedings of the IEEE Conference on Computer Communications (INFOCOM), Apr. 26, 2015, pp. 567-575.

"Notice of Allowance Issued in U.S. Appl. No. 16/828,089", dated Mar. 8, 2022, 10 Pages.

Ge, et al., "Fine-Grained Control-Flow Integrity for Kernel Software", In Proceedings of the IEEE European Symposium on Security and Privacy, Mar. 21, 2016, 16 Pages.

Skadron, et al., "Improving Prediction for Procedure Returns with Return-Address-Stack Repair Mechanisms", In Proceedings of 31st Annual ACM/IEEE International Symposium on Microarchitecture, Dec. 2, 1998, pp. 259-271.

"International Search Report and Written Opinion issued in PCT Application No. PCT/US22/028891", dated Jul. 20, 2022, 11 Pages.

* cited by examiner

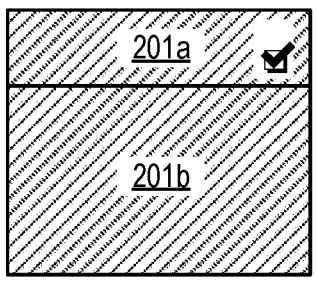
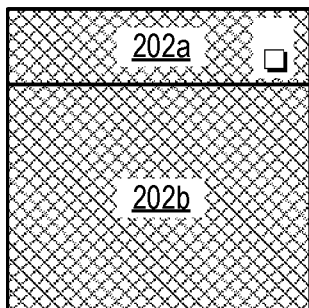
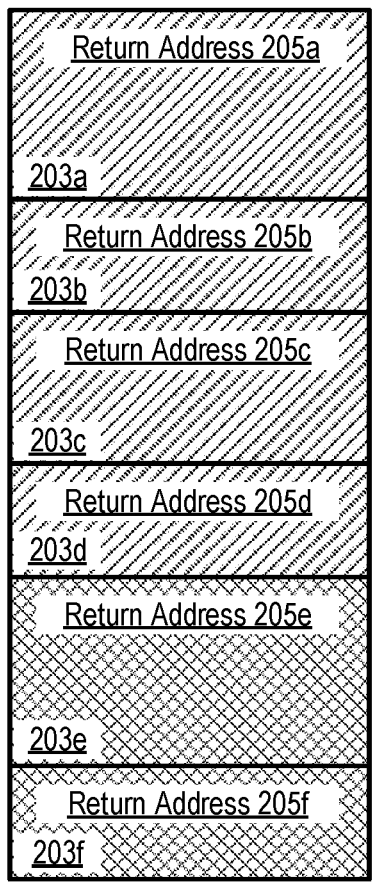
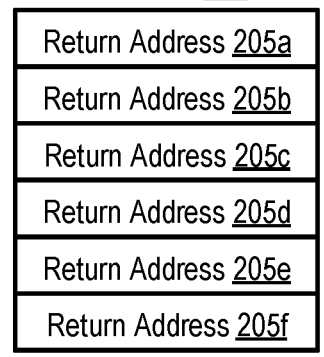
FIG. 2A

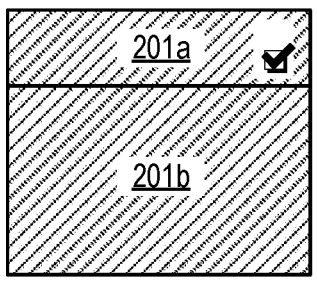
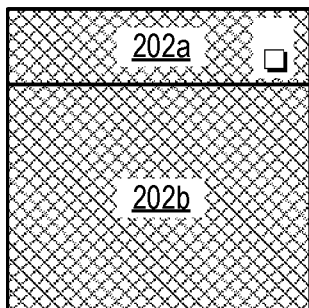
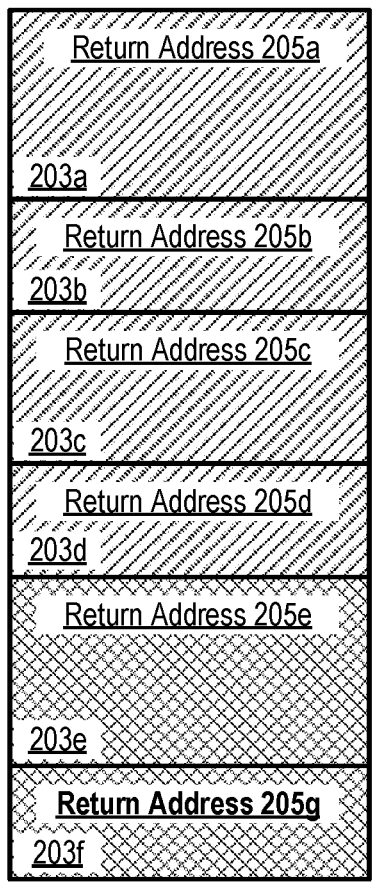
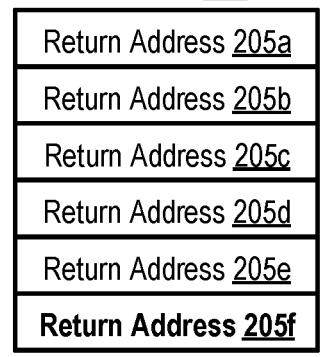
*FIG. 2B*

200c
Application Binary 201
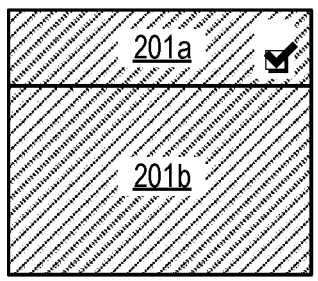
Call Stack 203
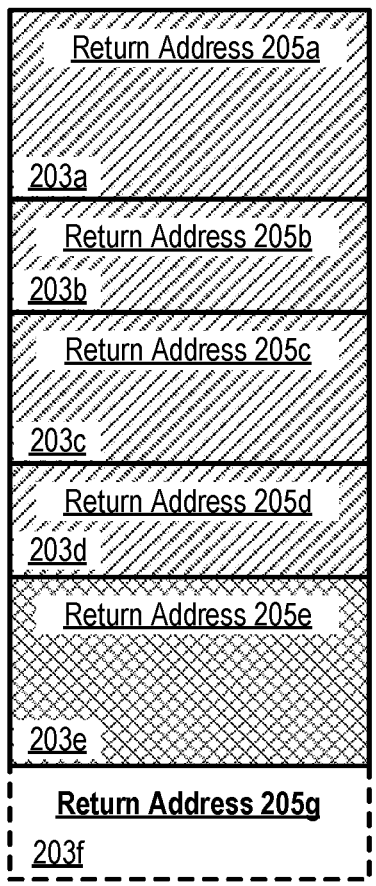
Shadow Stack 204
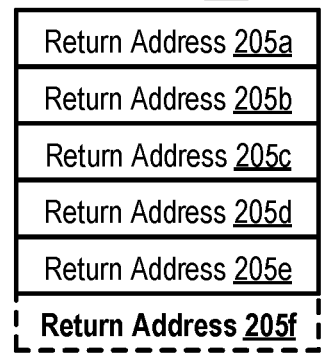
Module 202
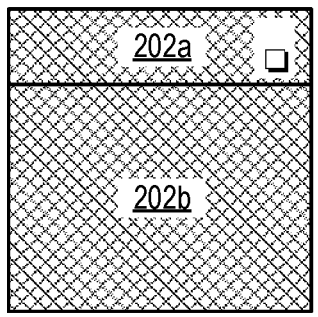
*FIG. 2C*

300

```
┌─────────────────────────────────────────────────────────────┐
│ Initiate Execution Of A Thread At A Processor, Based On An  │
│ Application Binary Having Shadow Stack Enforcement Enabled  │
│                                                         301 │
└─────────────────────────────────────────────────────────────┘
                               │
                               ▼
┌─────────────────────────────────────────────────────────────┐
│ Process A Shadow Stack Violation Based On Execution Of The  │
│ Thread                                                  302 │
│  ┌───────────────────────────────────────────────────────┐  │
│  │ Determine That The Exception Was Triggered By         │  │
│  │ Execution Of A Module Called By The Application Binary│  │
│  │                                                   303 │  │
│  └───────────────────────────────────────────────────────┘  │
│                             │                               │
│                             ▼                               │
│  ┌───────────────────────────────────────────────────────┐  │
│  │ Determine Whether The Module Has Shadow Stack         │  │
│  │ Enforcement Enabled                               304 │  │
│  └───────────────────────────────────────────────────────┘  │
│                             │                               │
│                             ▼                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─┐  │
│     Identify An Enforcement Rule For The Module              │
│  │                                                   305 │  │
│  └ ─ ─ ─ ─ ─ ─ ─ ─ ─ ─ ─ ─ ─ ─ ─ ─ ─ ─ ─ ─ ─ ─ ─ ─ ─ ─ ─┘  │
│                             │                               │
│                             ▼                               │
│  ┌───────────────────────────────────────────────────────┐  │
│  │ Enforce A Shadow Stack Violation Policy For The       │  │
│  │ Module                                            306 │  │
│  │ ┌ ─ ─ ─ ─ ─ ─ ─ ─ ─ ─ ─┐ ┌ ─ ─ ─ ─ ─ ─ ─ ─ ─ ─ ─ ┐ │  │
│  │   Terminate The Thread     Permit The Thread To      │  │
│  │ │                     │ │  Continue Executing     │  │  │
│  │   → When Shadow Stack                                │  │
│  │ │ Enforcement Is      │ │ → When Shadow Stack     │  │  │
│  │   Enabled For The          Enforcement Is Not         │  │
│  │ │ Module              │ │ Enabled For The Module  │  │  │
│  │   → When Shadow Stack    → When Shadow Stack         │  │
│  │ │ Enforcement Is Not  │ │ Enforcement Is Not      │  │  │
│  │   Enabled For The          Enabled For The Module,   │  │
│  │ │ Module, And When    │ │ And When The Rule       │  │  │
│  │   The Rule Specifies       Specifies That The        │  │
│  │ │ That The Shadow     │ │ Shadow Stack Violation  │  │  │
│  │   Stack Violation          Should Be Permitted       │  │
│  │ │ Should Not Be       │ │ → When Audit Mode Is    │  │  │
│  │   Permitted                Enabled                   │  │
│  │ │ → When Enforcement  │ │                    306b │  │  │
│  │   Mode Is Enabled                                    │  │
│  │ │                306a │ └ ─ ─ ─ ─ ─ ─ ─ ─ ─ ─ ─ ┘ │  │
│  │ └ ─ ─ ─ ─ ─ ─ ─ ─ ─ ─ ─┘                           │  │
│  └───────────────────────────────────────────────────────┘  │
│                             │                               │
│                             ▼                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─┐  │
│               Log The Exception                      307    │
│  └ ─ ─ ─ ─ ─ ─ ─ ─ ─ ─ ─ ─ ─ ─ ─ ─ ─ ─ ─ ─ ─ ─ ─ ─ ─ ─ ─┘  │
└─────────────────────────────────────────────────────────────┘
```

*FIG. 3*

SHADOW STACK ENFORCEMENT RANGE FOR DYNAMIC CODE

CROSS-REFERENCE TO RELATED APPLICATIONS

This application is a continuation-in-part of U.S. application Ser. No. 16/828,089, filed Mar. 24, 2020, and entitled SHADOW STACK VIOLATION ENFORCEMENT AT MODULE GRANULARITY, the entire content of which is incorporated herein by reference.

BACKGROUND

In most modern computing architectures, an operating system allocates a portion of system memory for each thread to a call stack (sometimes referred to as a machine stack or an execution stack). This call stack is used to facilitate procedure calls (e.g., functions, routines, etc.) within application code. In general, each time a procedure is called during execution of a thread, a new stack frame is added or "pushed" to the call stack for that thread. This stack frame is generally created by a "prologue" to the procedure which can save state information needed to return to the calling context (e.g., a return address of the next instruction to be executed after the procedure exits, saved register values, etc.), allocate memory for any parameters passed to the procedure, allocate memory for local variables to the procedure, etc. The particular data that is included in a stack frame, and the layout of that data, varies depending on processor architecture, operating system, etc. When a procedure exits, its stack frame is removed or "popped" from the call stack for the thread. This stack frame is generally removed by an "epilogue" to the procedure, which can restore saved information needed by the calling context (e.g., by placing a saved return address in a program counter or instruction counter, restore saved register values, etc.) and deallocate any call stack memory that was occupied by the stack frame.

Recently, some operating systems and/or processors have included support for shadow stacks. A shadow stack is a mechanism for protecting a procedure's stored return address from malicious or unintentional modification, such as when a call stack "buffer overflow" causes the procedure to return to an address other than its proper return address when it completes (e.g., within malicious code, rather than the calling context). For example, a malicious actor may be able to accomplish a stack buffer overflow attack by taking advantage of flaws in a procedure's bounds checking to write beyond the amount of memory allocated to parameters and/or local variables in the procedure's stack frame, and into stack memory in the procedure's stack frame that is used to store the procedure's return address. Thus, the malicious actor can use a stack buffer overflow to replace a procedure's stored memory address with a new memory address (e.g., within the malicious actor's own code, or within code that was not otherwise intended to be executed upon return from the procedure). A shadow stack for a thread is a second, separate stack that "shadows" a thread's normal call stack. When shadow stack enforcement is enabled for an application's thread, execution of each of that application's procedure prologues causes a return address to be stored in both the thread's call stack and the thread's shadow stack. Execution of each of that application's procedure epilogues, on the other hand, causes a return address to be loaded from both the thread's call stack and the thread's shadow stack, and then compared. If the two records of the return address differ between the call stack and the shadow stack, then a shadow stack violation is detected and the thread (or the process to which the thread belongs) is terminated.

BRIEF SUMMARY

Presently, shadow stack violations are enforced for an entire thread (or process), regardless of what particular code that actually triggered the violation. However, a thread that is executed from an application binary frequently executes code that is not part of the application binary, itself. For example, applications frequently call procedures within modules that are not part of the application, itself. For example, modules could take the form of shared libraries such as dynamic link libraries (DLLs) under WINDOWS, or shared objects under LINUX. These libraries could be part of an operating system or could otherwise be provided by third parties. Thus, using existing shadow stack violation handling techniques, if shadow stack enforcement is enabled for an application, and if a thread executing for that application encounters a shadow stack violation during execution of a module called by that applications' code, that entire thread (potentially including the entire process to which the thread belongs) is terminated.

At least some embodiments described herein enforce shadow stack violations at module granularity, rather than at the granularity of an entire thread (or process). For example, rather than simply terminating a thread (or the process to which it belongs) when a shadow stack violation is detected on the thread's stack, embodiments include new additional checks to determine if the shadow stack violation occurred during execution of a called module, and if so, whether or not shadow stack enforcement is enabled for that module. If the shadow stack violation occurred during execution of a module, and if shadow stack enforcement is enabled for that module, embodiments proceed to terminate the thread (or the process to which the thread belongs). However, if shadow stack enforcement is not enabled for that module, some embodiments choose to permit the thread to continue executing, rather than terminating the thread as would be typical. Thus, the embodiments herein make a decision as to whether to terminate the thread (or the process to which it belongs) at module granularity, rather than at thread (or process) granularity.

It will be appreciated that enforcement of shadow stack violations at module granularity, rather than at thread/process granularity as would be typical, can increase overall security in a computer system, as well as increase the technical ability of applications to utilize shadow stack technologies. For example, there are many situations in which it would be desirable for an application author to configure the application for enforcement of shadow stack violations by the application's own code, but permit shadow stack violations by the code executing within a module the application calls. In one example, the application could call a module that validly tampers with return addresses (e.g., via return-oriented programming (ROP)). For instance, the application could execute within an environment in which an antivirus application injects code into the application, which causes the application to call such a module. In another example, the application could call a module that non-maliciously triggers a shadow stack violation (e.g., due to a bug). Rather than needing to entirely disable shadow stack enforcement on this application due to its interaction with these modules, the embodiments herein enforce shadow stack violations for the application's code, while permitting shadow stack violations by called module code (i.e., without terminating the application). In this way, shadow stack enforcement can be enabled for an application even if it calls external modules that intentionally tamper with return addresses or that are not yet shadow stack compatible. Thus, the embodiments herein enable the use of shadow stack enforcement for an application—even in situations where it was previously impossible or impractical due to the module(s) upon which the application relies, or due to the environment in which the application executes.

Additionally, at least some embodiments described herein enable an executing application to specify one or more memory range(s) that store code that has been dynamically generated by the application, and for which shadow stack violations should be enforced during the dynamically generated code's execution. These embodiments are useful, for example, to facilitate shadow stack violation enforcement within the context of managed runtimes (including virtual machine runtimes) that execute just-in-time compiled code that is hosted by the managed runtime. For example, even if an author of a managed runtime could guarantee that the code implementing the managed runtime, itself, does not cause shadow stack violations (and thus qualify the managed runtime for shadow stack protection), the author may be unable to make such guarantees about the hosted code the managed runtime just-in-time compiles and executes within its process/thread context. Thus, in many situations, it may be impractical to compile a managed runtime with shadow stack enforcement enabled globally. However, there is often a desire to enforce shadow stack violations by code that is hosted/executed by a managed runtime. Using the embodiments herein, a managed runtime is enabled to specify into which memory region(s) the managed runtime has stored dynamic code (i.e., a just-in-time compiled version of hosted code), which results in shadow stack violations being enforced during execution of this dynamic code. Thus, in embodiments, at least a portion of dynamically-generated executable code for which shadow stack violations should be enforced is identified, and one or more ranges of addresses (e.g., virtual addresses) where this dynamic code has been loaded in memory is identified. When a shadow stack exception occurs during execution of this dynamic code, an exception handler determines whether a return address (e.g., obtained from a shadow stack) causing exception is within identified range(s) of addresses. When it is determined that the return address is within the identified range(s) of addresses, the violation is handled (e.g., a thread/process is terminated, the violation is audited, the violation is ignored per a rule, etc.).

Some embodiments are directed to methods, systems, and computer program products that enforce a shadow stack violation at module granularity. Execution of a thread is initiated at a processor. This includes initiating execution of first executable code of an application binary that calls second executable code of an external module. The application binary is enabled for shadow stack enforcement. Based at least on execution of the thread at the processor, an exception is processed. The exception is triggered by a mismatch between a first return address popped from a call stack corresponding to the thread and a second return address popped from a shadow stack corresponding to the thread. Processing the exception includes determining that the exception resulted from execution of an instruction in the second executable code of the external module, and determining whether or not the external module is enabled for shadow stack enforcement. Based on having determined whether the external module is enabled for shadow stack enforcement, processing the exception includes performing one of (i) terminating execution of the thread based at least on the external module being enabled for shadow stack enforcement, or (ii) permitting the thread to continue executing based at least on the external module not being enabled for shadow stack enforcement.

Additional embodiments are directed to methods, systems, and computer program products that enforce a shadow stack violation at module granularity while using rules. Execution of a thread is initiated at a processor. This includes initiating execution of first executable code of an application binary that calls second executable code of an external module. The application binary is enabled for shadow stack enforcement. Based at least on execution of the thread at the processor, an exception is processed. The exception is triggered by a mismatch between a first return address popped from a call stack corresponding to the thread and a second return address popped from a shadow stack corresponding to the thread. Processing the exception includes determining that the exception resulted from execution of an instruction in the second executable code of the external module, determining whether or not the external module is enabled for shadow stack enforcement, and identifying a rule based at least on an identity of the external module. Based on having determined whether the external module is enabled for shadow stack enforcement, processing the exception includes performing one of (i) terminating execution of the thread based at least on the external module being enabled for shadow stack enforcement; (ii) terminating execution of the thread based at least on the external module being not being enabled for shadow stack enforcement, and on the rule specifying that a shadow stack violation should not be permitted; or (iii) permitting the thread to continue executing based at least on the external module not being enabled for shadow stack enforcement, and on the rule specifying that a shadow stack violation should be permitted.

Additional embodiments are directed to methods, systems, and computer program products that enforce a shadow stack violation during execution of dynamic code. Execution of a thread is initiated at a processor, which includes generating a portion of dynamic code for execution by the thread, identifying a range of memory addresses where the portion of dynamic code is loaded in memory, and initiating execution of the portion of dynamic code. Based at least on execution of the thread at the processor, processing an exception is triggered by a mismatch between a first return address popped from a call stack corresponding to the thread and a second return address popped from a shadow stack corresponding to the thread. The processing of the exception includes determining whether or not the second return address popped from the shadow stack is within the identified range of addresses where the portion of dynamic code is loaded. Based on having determined that the second return address is within the range of addresses, a shadow stack enforcement action is initiated.

In some embodiments, initiating the shadow stack enforcement action includes terminating the thread. In some embodiments, initiating the shadow stack enforcement action includes logging data associated with the exception. In some embodiments, generating the portion of dynamic code for execution by the thread comprises just-in-time compiling source code. In some embodiments, the thread uses a JavaScript just-in-time compiler to generate the portion of dynamic code. In some embodiments, the system determines that an enforcement mode is enabled. Based on the determination that the enforcement mode is enabled, the system terminates execution of the thread, otherwise, the system permits the thread to continue executing. In some embodiments, processing the exception also includes determining whether an audit mode is enabled, and as a result of audit mode being enabled, logging data associated with the exception, including logging an identification of the portion of dynamic code, an identifier of a process to which the thread belongs, an identifier of the thread, that an audit mode is enabled, and/or that an enforcement mode is enabled. In some embodiments, initiating the shadow stack enforcement action includes identifying a rule based at least on an identity of the portion of dynamic code, and the thread is permitted to continue executing when the rule specifies that a shadow stack violation should be permitted based, at least in part, on the identity of the portion of dynamic code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A-2C illustrate example operation of enforcement of shadow stack violations at module granularity;

FIG. 3 illustrates a flow chart of an example method for enforcing a shadow stack violation at module granularity;

DETAILED DESCRIPTION

Figure 1A:
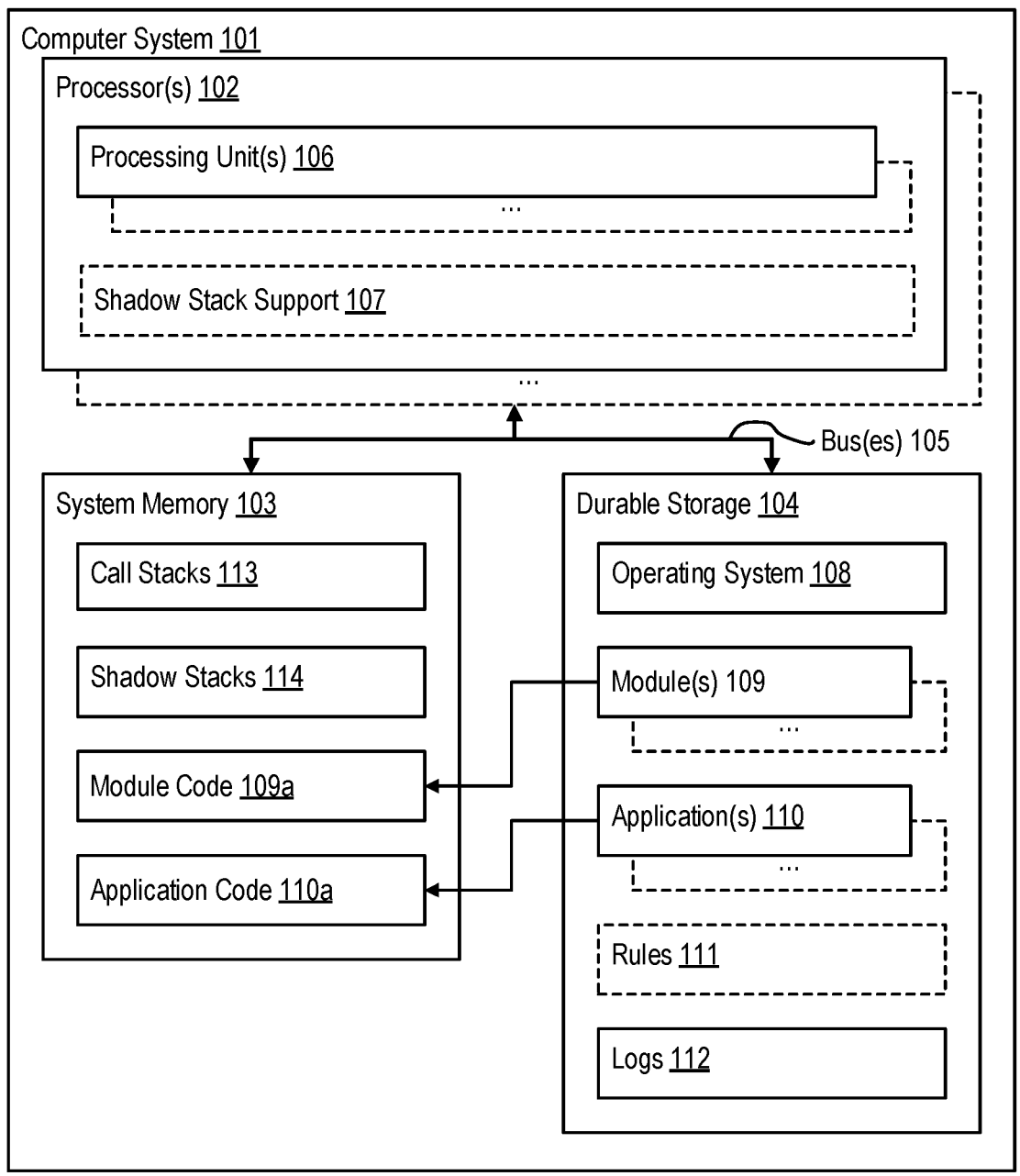
FIG. 1A illustrates an example computer system that facilitates enforcing shadow stack violations at module granularity.

FIG. 1A illustrates an example computer system 101 that facilitates enforcing shadow stack violations at module granularity. Computer system 101 comprises or utilizes a special-purpose or general-purpose computer hardware, such as, for example, one or more processors 102, system memory 103, and durable storage 104, which are communicatively coupled using one or more communications buses 105.

Embodiments within the scope of the present invention include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 includes (among other things) one or more processing units 106 (e.g., processor cores), each of which loads and executes machine code instructions from system memory 103 (usually via one or more processor caches, not shown). In some embodiments, processor(s) 102 include hardware and/or microcode that provide shadow stack support 107 by the processor 102. The particular functionality of processor-based shadow stack support 107 can vary depending on design choices, but example functionality includes the ability to allocate and protect memory regions for shadow stack use (e.g., via page table mappings), the ability to "push" return addresses onto a shadow stack during execution of a procedure prologue (e.g., as part of execution of a "call" instruction), the ability to "pop" a return address from a shadow stack during execution of a procedure epilogue (e.g., as part of execution of a "return" instruction), the ability to compare one return address popped from a call stack with another return address popped from a shadow stack (e.g., as part of execution of a "return" instruction), and/or the ability to trigger an exception when there is a mismatch between the return address popped from a call stack and the return address popped from a shadow stack. However, it will be appreciated that the embodiments herein could be implemented without processor-based shadow stack support 107. For example, functionality of shadow stack support 107 could instead be provided by an operating system and/or could be complied into procedure prologues and epilogues of an application binary.

As illustrated, the durable storage 104 stores computer-executable instructions and/or data structures representing executable software components; correspondingly, during execution of this software at the processor(s) 102, one or more portions of these computer-executable instructions and/or data structures are loaded into system memory 103. For example, the durable storage 104 is shown as storing computer-executable instructions and/or data structures corresponding to an operating system 108, one or more module(s) 109, and one or more application(s) 110. The durable storage 104 also stores data, such as rules 111 and logs 112.

The system memory 103 is capable of storing a broad variety of data, but for purposes of illustrating the embodiments herein, the system memory 103 is shown as storing at least a portion of code of at least one running application (i.e., application code 110a) and at least a portion of code of a module called by that running application (i.e., module code 109a), as well as memory allocated to call stacks 113 and shadow stacks 114 (including, for example, a call stack and a shadow stack for the running application).

Figure 1B:
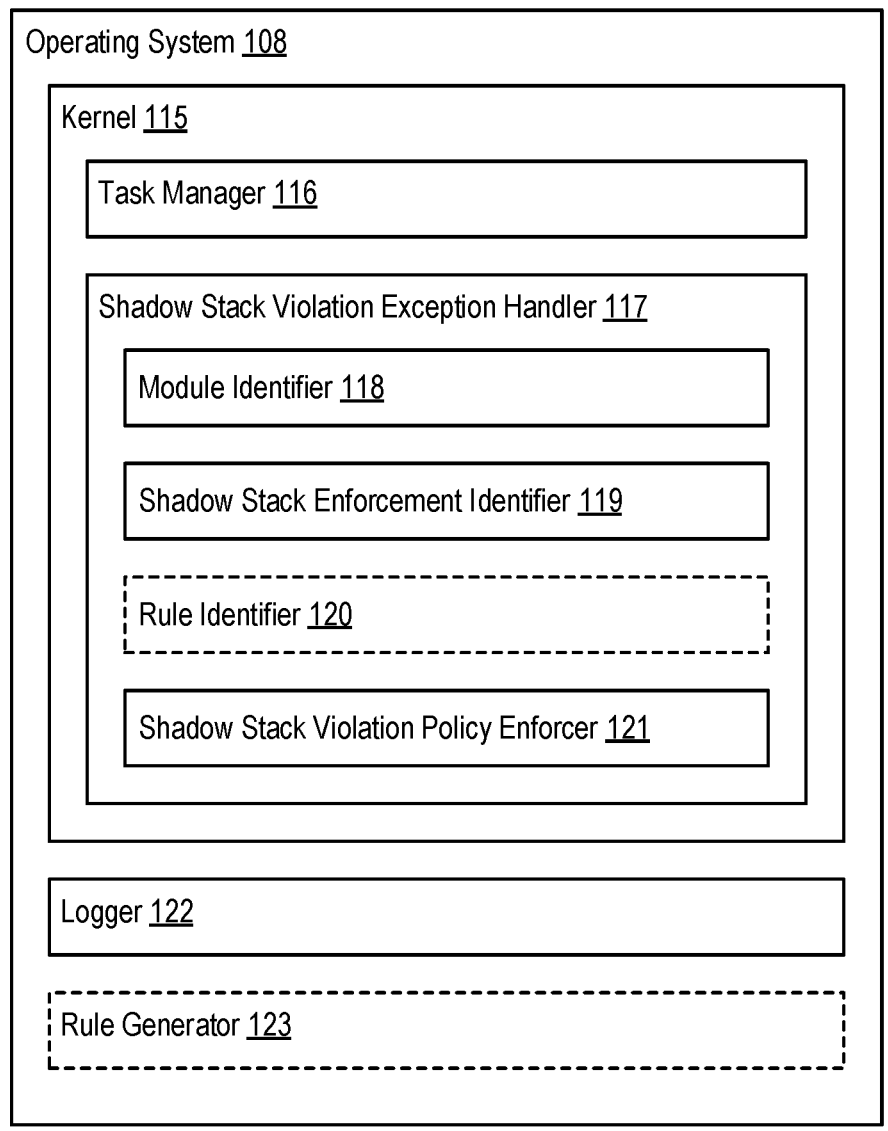
FIG. 1B illustrates example operating system components that facilitate enforcing shadow stack violations at module granularity.

FIG. 1B illustrates details of operating system 108, including example components that facilitate enforcing shadow stack violations at module granularity, according to some embodiments. It will be appreciated that the depicted components—including their identity, sub-components, and arrangement—are presented merely as an aid in describing various embodiments of operating system 108 described herein, and that these components are non-limiting to how software and/or hardware might implement various embodiments described herein, or of the particular functionality thereof.

Operating system 108 is illustrated as including kernel 115 that includes a task manager 116 which is responsible for launching and managing execution of processes (including one or more threads) at processor(s) 102 based on code of operating system 108 and application(s) 110. The kernel 115 is also shown as including a shadow stack violation exception handler 117 (referred to hereinafter as exception handler 117) that processes exceptions when a shadow stack violation is detected during execution of a thread. In some embodiments, execution of the exception handler 117 is triggered by the shadow stack support 107 of processor(s) 102 (e.g., via a hardware interrupt) when a mismatch between a call stack return address and a shadow stack return address is detected. However, the exception handler 117 could be triggered in other ways (e.g., via a software interrupt or exception), such as by code that executes as part of a procedure epilogue and that determines whether or not a call stack return address and a shadow stack return address match. Thus, the exception handler 117 is capable of being utilized in a wide variety of environments, including those that include hardware support for shadow stacks (e.g., shadow stack support 107), and those that lack hardware shadow stack support (e.g., in which shadow stack functionality is implemented entirely in software, such as via specially-configured procedure prologues and epilogues).

It is noted that the description of exception handler 117 herein is focused on handling of exceptions when a module called by a primary application binary causes a shadow stack violation. It will be appreciated that the exception handler 117 could be invoked in other situations as well, such as when the primary application binary, itself, causes a shadow stack violation. Thus, in addition to the description herein of the handling of exceptions when a module called by a primary application binary causes a shadow stack violation, the exception handler 117 could also be configured to handle other situations, such as such as when the primary application binary, itself, causes a shadow stack violation. It will be appreciated, therefore, that the description of the exception handler 117 herein is not limited to those scenarios and functions specifically described herein.

The operating system 108 is also shown as including a logger 122, and as potentially including a rule generator 123. In general, the logger 122 generates log entries (e.g., which are stored in logs 112) in connection with operation of the exception handler 117. In general, the rule generator 123, if present, processes logs 112, and/or sends logs 112 to a remote system for processing. As a result of rule generator 123, computer system 101 generates and/or receives rules 111 that are usable by the exception handler 117. Note that while the rule generator 123 is depicted, for ease in illustration, as being part of operating system 108, in some embodiments the rule generator 123 is part of a separate application 110 (e.g., a system security application, such as an antivirus application).

Figure 4:
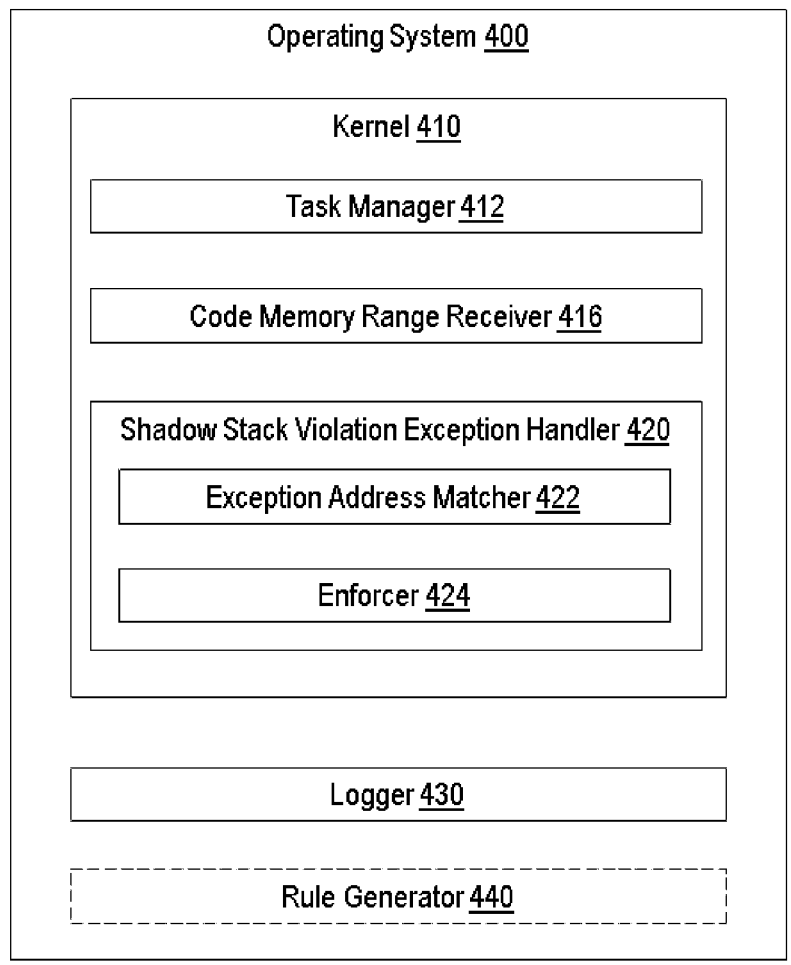
FIG. 4 illustrates example operating system components that facilitate enforcing shadow stack violations during execution of dynamic code.
Figure 5:
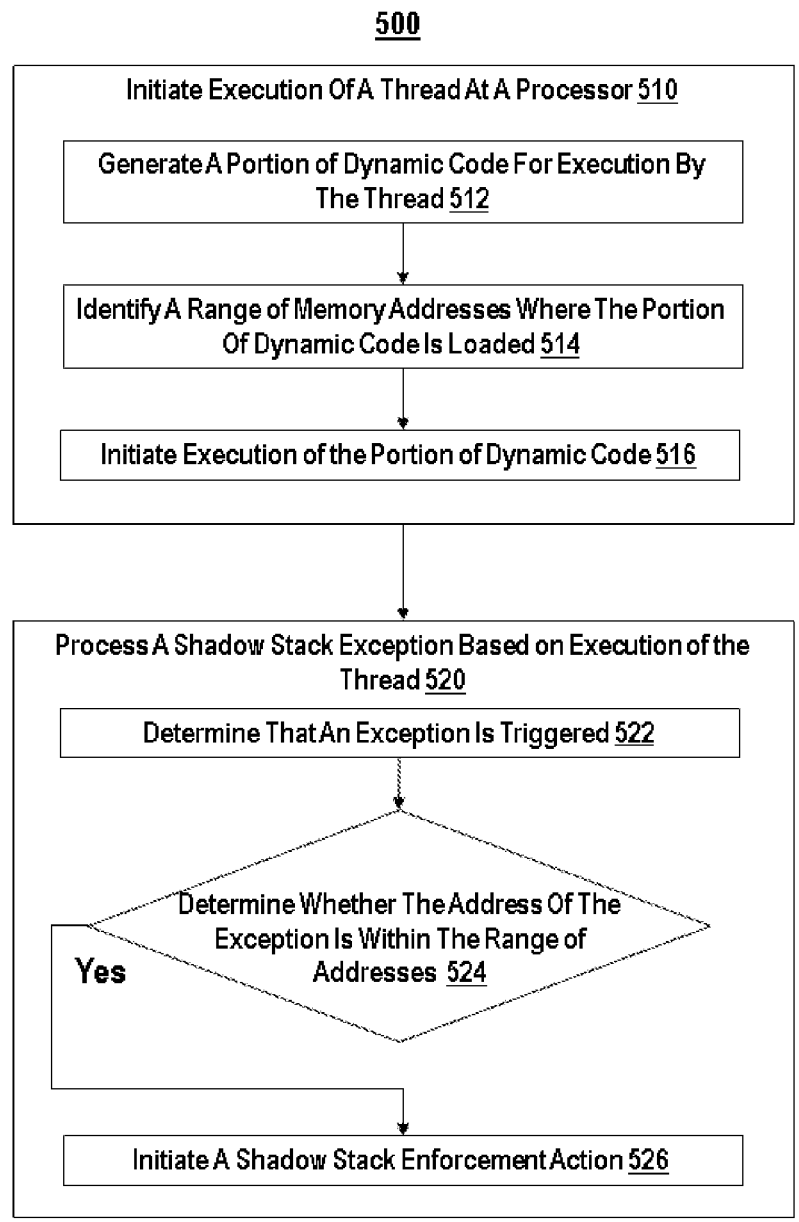
FIG. 5 illustrates a flow chart of an example method for enforcing a shadow stack violation during execution of dynamic code.

Further, additional embodiments illustrated in FIGS. 4 and 5 facilitate shadow stack violation enforcement within the context of applications, such as managed runtimes (including runtime virtual machines), that execute just-in-time compiled code within the application's thread context, even when the application is not compiled to enable and/or request "strict" shadow stack violation enforcement. In embodiments, a "strict" shadow stack violation enforcement is performed when an application is compiled to enable shadow stack violation enforcement (which includes, for example, the compiler setting one or more header flags in the application's binary image). In embodiments, when strict shadow stack violation enforcement is enabled for an application, the shadow stack violation policy enforcer 121 is configured to terminate the application when shadow stack violations are identified by the shadow stack enforcement identifier 119 during its execution. In accordance with the embodiments herein, applications that execute dynamic code may be complied such that they execute without strict shadow stack violation enforcement, but are enabled to specify one or more ranges of memory addresses storing dynamic code, and for which shadow stack violation enforcement should be enabled during its execution. In embodiments, this is accomplished through the lack of one or more header flags requesting strict shadow stack violation enforcement and/or through the presence of one or more header flags requesting shadow stack enforcement for dynamic code. Some embodiments restrict applications that are complied with strict shadow stack violation enforcement enabled from being able to specify such memory range(s), since shadow stack enforcement is already enabled for the application as a whole.

FIG. 4 illustrates an example operating system 400, including example components that facilitate enforcing shadow stack violations for dynamic code, according to some embodiments. It will be appreciated that the depicted components—including their identity, sub-components, and arrangement—are presented merely as an aid in describing various embodiments of operating system 400 described herein, and that these components are non-limiting to how software and/or hardware might implement various embodiments described herein, or of the particular functionality thereof.

In embodiments, the operating system 400 corresponds to the operating system 108 of FIG. 1A. The operating system 400 is illustrated as including kernel 410 that includes a task manager 412, which is responsible for launching and managing execution of processes (including one or more threads) at processor(s) 102 (of FIG. 1A) based on code of operating system 400 and applications 110 (of FIG. 1A).

The kernel 410 is also shown as including a code memory range receiver 416 that is configured to receive a range of memory addresses where dynamic code is loaded and for which shadow stack violations should be enforced. In some cases, execution of a thread at the processor (e.g., based on the task manager 412 initiating that thread's execution) includes (i) the thread generating a portion of dynamic code for execution by the thread (e.g., by a just-in-time compiler), (ii) the thread identifying a range of memory addresses where the portion of dynamic code is loaded in the memory, and (iii) the thread initiating execution of the portion of dynamic code. The code memory range receiver 416 receives the identified range of memory addresses, such as based on the thread calling the code memory range receiver 416 via an API. In embodiments, the code memory range receiver 416 only permits calls from threads that are loaded from binary images that have shadow stack violation enforcement for dynamic code enabled (e.g., by the presence, or lack, of certain header flags). In additional, or alternative, embodiments, the code memory range receiver 416 only permits calls from threads that are loaded from binary images that have an identity that matches a rule— such as that a digital signature of the binary image chains to specified digital certificate.

The kernel 410 is also shown as including a shadow stack violation exception handler 420 (referred to hereinafter as exception handler 420) that processes exceptions when a shadow stack violation is detected during execution of a thread. In some embodiments, similar to the exception handler 117 of FIG. 1B, execution of the exception handler 420 is triggered by the shadow stack support 107 of processor(s) 102 of FIG. 1A (e.g., via a hardware interrupt) when a mismatch between a call stack return address and a shadow stack return address is detected. However, the exception handler 420 could be triggered in other ways (e.g., via a software interrupt or exception), such as by code that executes as part of a procedure epilogue and that determines whether or not a call stack return address and a shadow stack return address match. Thus, the exception handler 420 is capable of being utilized in a wide variety of environments, including those that include hardware support for shadow stacks (e.g., shadow stack support 107), and those that lack hardware shadow stack support (e.g., in which shadow stack functionality is implemented entirely in software, such as via specially-configured procedure prologues and epilogues).

In embodiments, exception handler 420 is capable of handling exceptions caused by shadow stack violations that occur during execution of dynamic code. In embodiments, this handling for dynamic code may be restricted to binaries that are compiled (and thus loaded) as a binary that has enforcement for dynamic code enabled (e.g., through the lack of a flag requesting strict shadow stack violation enforcement and/or the presence of a flag requesting enforcement for dynamic code). The exception handler 420 is shown to include an exception address matcher 422 and an enforcer 424. When a mismatch of a return addresses in the regular call stack and a return address in the shadow stack is detected, an exception occurs. When an exception occurs, the exception address matcher 422 is configured to determine whether the return address in the shadow stack is within any range(s) of addresses received by the code memory range receiver 416. When it is determined that the return address in the shadow stack is within a range of the addresses identified by the code memory range identifier 416, the enforcer 424 initiates a shadow stack enforcement action. In some embodiments, the enforcer 424 simply terminates the thread. Alternatively, or in addition, the enforcer 424 logs data associated with the exception. In some embodiments, the enforcer 424 handles the exception based on other rules and conditions set by the operating system or users.

Similar to the operating system 108 of FIG. 1B, the operating system 400 is also shown as including a logger 430, and as potentially including a rule generator 440. Additionally, similar to the logger 122 of FIG. 1B, the logger 430 generates one or more log entries (e.g., which are stored in logs 122) in connection with operation of the exception handler 420. Again, similar to the rule generator 123 of FIG. 1B, in general, the rule generator 440, if present, processes logs 112, and/or sends logs 112 to a remote system for processing. As a result of rule generator 440, computer system 101 generates and/or receives rules 111 that are usable by the exception handler 420.

Note that the code memory range receiver 416 is depicted, for ease in illustration, as being independent from the exception handler 420. However, in some embodiments, the code memory range receiver 416 is part of the exception handler 420, or is separate from the kernel 410 altogether (e.g., as part of a user-mode component). Also, note that while the rule generator 440 is depicted as being part of operating system 400, in some embodiments, the rule generator 440 is part of a separate application 110 (e.g., a system security application, such as an antivirus application).

Further, the embodiments illustrated in FIG. 1B and FIG. 4 are not exclusive to each other. In some embodiments, an operating system includes components in both operating system 108 of FIG. 1B and operating system 400 of FIG. 4. For example, an operating system may include a code memory range receiver 416, a shadow stack violation exception handler that comprises an exception address matcher 422, an enforcer 424, a module identifier 118, a shadow stack enforcement identifier 119, and/or shadow stack violation policy enforcer 121. Thus, some embodiments can facilitate shadow stack violation handling for both modules and for dynamic code, or even for modules comprising dynamic code. In some embodiments, when a mismatch is identified, the shadow stack enforcement identifier 119 first determines whether the application binary has shadow stack enforcement enabled, and in response to determining that the application binary does not have shadow stack enforcement enabled, the exception address matcher 422 then determines whether the violation address is within an address range identified by the code memory range identifier 416, or vice versa.

In some embodiments, the operating system 108 or 400 may also allow users to set the exception handler 117 or 420 in various modes. For example, a user may set the exception handler 420 in an enforcement mode, which will enforce the exceptions that occur within the marked address range of code. On the other hand, when the user sets the exception handler 420 in a non-enforcement mode, or the shadow stack enforcement mode is not enabled, the exceptions that occur within the marked address range of code would not be enforced. As another example, a user may set the exception handler 117 or 420 in audit mode that logs data associated with the violations, including, but are not limited to, a calling site address, a target address, an identifier of the portion of dynamic code, an identifier of a process to which the thread belongs, an identifier of the thread, an audit mode is enabled, and/or whether the enforcement mode is enabled.

Further operation of the components of FIGS. 1A, 1B, and 4 are now described in connection with FIGS. 2A-2C (which illustrate an example operation of enforcement of shadow stack violations at module granularity), and in connection with FIG. 3 (which illustrates a flow chart of an example method 300 for enforcing a shadow stack violation at module granularity) and FIG. 5 (which illustrates a flow chart of an example method 500 for enforcing a shadow stack violation for dynamic code). The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

Referring initially to FIG. 3, as shown, method 300 comprises an act 301 of initiating execution of a thread at a processor, based on an application binary having shadow stack enforcement enabled. In some embodiments, act 301 comprises initiating execution of a thread at the processor, including initiating execution of first executable code of an application binary that calls second executable code of an external module, the application binary having been enabled for shadow stack enforcement. For example, in an embodiment the task manager 116 initiates execution of one of applications 110 at processors(s) 102. Initiating execution includes the task manager 116 causing application code 110a for the application 110 to be loaded into system memory 103, creating kernel data structures supporting execution of one or more threads at processing unit(s) 106, and creating (or initiating creation of) a call stack (i.e., within call stacks 113) for each of these one or more threads. In addition, since shadow stack enforcement is enabled for the application's binary, initiating execution also includes the task manager 116 creating (or initiating creation of) a shadow stack 114 (i.e., within shadow stacks 114) for each of these one or more threads.

In a more particular example, FIG. 2A illustrates an example 200a that depicts a representation of an application binary 201. While binary formats vary from operating system to operating system, in general, a binary includes a header describing properties and layout of the binary, and a body that comprises application code and data (e.g., in the form a text segment, a data segment, etc.). Thus, in FIG. 2A, application binary 201 is shown as including a header 201a portion and a body 201b portion. In embodiments, as part of initiating execution of an application's binary (e.g., application binary 201), the task manager 116 reads the binary's header (e.g., header 201a) to obtain binary properties and layout, and loads at least a portion of the binary's body (e.g., body 201b) into system memory 103 (e.g., at least a portion of which could correspond to application code 110a). In FIG. 2A, header 201a is shown as including a checkbox containing a checkmark. In FIG. 2A, this checkbox represents a flag or other indicator of whether or not the application binary 201 was compiled with support for, and requests enforcement of, shadow stacks. Note that it is possible that a binary could be compiled to support shadow stacks (i.e., the binary is shadow stacks aware/compliant), but not actually request their enforcement (i.e., the binary has not opted-in to shadow stack enforcement). Thus, while header 201a is shown as including a binary indicator (i.e., checked or not), it is possible for header 201a to have a more comprehensive set of flags/indicators. In example 200a, since header 201a includes checkmark, shadow stack enforcement is enabled for application binary 201 and/or the binary has opted-in to shadow stack enforcement. Thus, when the task manager 116 initiates execution of application binary 201, task manager 116 creates shadow stack(s) for any thread(s) created for that binary. FIG. 2A shows that the task manager 116 has initiated execution of at least one thread for application binary 201, since it creates a call stack 203 and a shadow stack 204 corresponding to that initiated thread. It is noted that, in FIG. 2B, call stack 203 and shadow stack 204 "grow" downward; that is, new information is pushed onto the bottom of these stacks, such that the "top" item on the stack is visually shown at the bottom of the call stack 203 and the shadow stack 204.

In embodiments, when an application binary is loaded, the task manager 116 identifies any module(s) that will be accessed by that binary during its execution (e.g., based on information in header 201a). FIG. 2A depicts a module 202 that is called by application binary 201. Similar to application binary 201, module 202 is shown as including a header 202a portion and a body 202b portion. At least a portion of the code of body 202b can be loaded to system memory (e.g., module code 109a) in connection with initiating execution of application binary 201, or at some later time. In FIG. 2A, header 202a is shown as having an empty checkbox. Thus, since header 201a lacks checkmark in the checkbox, shadow stack enforcement is not supported by module 202 and/or the module has not opted-in to shadow stack enforcement. However, since shadow stack enforcement is enabled for application binary 201, and since the code of module 202 executes within the context of call stack 203, computer system 101 also maintains shadow stack 204 during execution of the code of module 202.

Notably, in connection with initiating execution of a thread for application binary 201, the task manager 116 can store a record (e.g., as part of kernel thread data structures) of whether or not shadow stack enforcement is enabled and/or requested for each of application binary 201 and module 202. Thus, in some embodiments, act 301 comprises storing a record of whether or not the external module is enabled for shadow stack enforcement in connection with initiating execution of the thread.

FIG. 2A shows a state of call stack 203 and shadow stack 204 after the initiated thread has executed for at least some period of time. For example, call stack 203 is shown as including four stack frames 203a-203d that were created in connection with execution of code of application binary 201 (e.g., due to internal procedure calls within that binary), as well as two stack frames 203e-203f that were subsequently created in connection with execution of code of module 202 (e.g., due to application binary 201 calling a procedure within module 202, and due to module 202 calling an internal procedure). Each of these stack frames 203a-203f is illustrated as storing a corresponding return address (i.e., return address 205a for stack frame 203a, return address 205b for stack frame 203b, return address 205c for stack frame 203c, return address 205d for stack frame 203d, return address 205e for stack frame 203e, and return address 205f for stack frame 203f). Correspondingly, shadow stack 204 is shown as also storing these same return addresses 205, in the same order. Since the "stack" or return addresses on call stack 203 match the "stack" of return addresses on shadow stack 204, as of FIG. 2A there are would be no shadow stack violations if stack frames 203a-203f were to be popped from the call stack 203.

Turning to FIG. 2B, the current "top" stack frame 203f on call stack 203 now contains a new return address (i.e., return address 205g), which differs from the "top" return address on shadow stack 204 (i.e., return address 205f). This new return address 205g could have been written to stack frame 203f due to a bug within module 202, due to intentional ROP behavior by module 202, or even due to a malicious attack targeting module 202. Turning to FIG. 2C, stack frame 203f is now being "popped" from call stack 203 (e.g., due to execution of a procedure epilogue within module 202). As a result, the return address 205f is also popped from shadow stack 204. By operation of shadow stack logic (e.g., as part of a procedure epilogue and/or by shadow stack support 107 within processor(s) 102), a mismatch is detected between return address 205g and return address 205f. As a result, a shadow stack violation is detected (e.g., by procedure epilogue code and/or by shadow stack support 107), triggering a hardware or software exception.

Returning to FIG. 3, method 300 also comprises an act of 302 of processing a shadow stack violation based on execution of the thread. In some embodiments, act 301 comprises, based at least on execution of the thread at the processor, processing an exception triggered by a mismatch between a first return address popped from a call stack corresponding to the thread and a second return address popped from a shadow stack corresponding to the thread. In an example, as a result of an exception triggered by the return address mismatch described in connection with FIGS. 2B and 2C, the exception handler 117 is invoked to handle the exception. The exception handler 117 is shown as including a variety of components that are usable for handling the exception. These components are described in connection with acts 303-306, which are shown in FIG. 3 as sub-acts of act 302.

Act 302 comprises an act of 303 of determining that the exception was triggered by execution of a module called by the application binary. In some embodiments, act 303 comprises determining that the exception resulted from execution of an instruction in the second executable code of the external module. For example, the exception handler 117 is shown as including a module identifier 118. In embodiments, the module identifier 118 operates to determine an identity of a module that triggered the exception, if any.

In some embodiments, the module identifier 118 operates by identifying a memory address corresponding to a "calling site" of an instruction that triggered the exception. For instance, if the instruction that triggered the instruction was a "return" instruction in a procedure epilogue, the memory address corresponding to the "calling site" of this instruction is the memory address at which the "return" instruction is stored in system memory. If this "return" instruction is part of a procedure epilogue of the executing application binary (e.g., application binary 201), then the instruction's memory address would be within a range of memory addresses occupied by application code 110a in system memory 103; in this case, the module identifier 118 would determine that the calling site address is part of the application binary. On the other hand, if this "return" instruction is part of a procedure epilogue of the module called by the application binary (e.g., module 202), then the instruction's memory address would be within a range of memory addresses occupied by module code 109a in system memory 103; in this case, the module identifier 118 would determine that the calling site address is part of the module.

In additional, or alternative, embodiments, the module identifier 118 operates by identifying a memory address corresponding to a memory address that was the "target address" of the instruction that triggered the exception. For instance, if the instruction that triggered the instruction was a "return" instruction in a procedure epilogue, the memory address corresponding to the "target address" of this instruction is the saved return address in the call stack frame for this procedure. If this saved return instruction is part of the executing application binary (e.g., application binary 201), then the instruction's memory address would be within a range of memory addresses occupied by application code 110*a* in system memory 103; in this case, the module identifier 118 would determine that the target site address is part of the application binary. On the other hand, if this saved return instruction is part of the module called by the application binary (e.g., module 202), then the instruction's memory address would be within a range of memory addresses occupied by module code 109*a* in system memory 103; in this case, the module identifier 118 would determine that the target site address is part of the module.

As will be appreciated, depending on the nature of the stack frame being removed, the module identifier 118 could identify the same entity for both of the calling site and the target address, or the module identifier 118 could identify different entities for each of the calling site and the target address. For example, a "return" instruction within module 202 could have as its target address a return address within module 202, in which case both of the calling site and the target address would correspond to the same entity. In another example, a "return" instruction within module 202 could have as its target a return address within application binary 201, or some other entity, in which case the calling site and the target address would correspond to different entities.

In view of the foregoing discussion of the module identifier 118 it will be appreciated that, in some embodiments of act 302, determining that the exception resulted from execution of the instruction in the second executable code of the external module comprises determining one or more of, (i) that a calling site address of the instruction corresponds to the second executable code of the external module, or (ii) that a target address of the instruction corresponds to the second executable code of the external module.

Referring again to the example of FIG. 2C, during processing of an exception triggered by removal of stack frame 203*f*, in embodiments of act 303 the module identifier 118 identifies module 202 as corresponding to a calling site address (i.e., since it would be a procedure epilogue of module 202 that removes the procedure epilogue). Depending on which code return address 205*g* corresponds to (if any), in some embodiments the module identifier 118 identifies a target site address as corresponding to module 202, to application binary 201, to some other entity, or to no entity at all.

As noted above, the exception handler 117 could be invoked in situations in which the exception was not triggered by a module, such as when the primary application binary, itself, causes a shadow stack violation. In these situations, the exception handler 117 might proceed to enforcing the shadow stack violation by terminating the thread, or by permitting the thread to continue executing if an audit mode is enabled. Audit mode is described later in connection with act 306.

Assuming a module is identified in act 303, act 302 also comprises an act of 304 of determining whether the module has shadow stack enforcement enabled. In some embodiments, act 304 comprises determining whether or not the external module is enabled for shadow stack enforcement. For example, the exception handler 117 is shown as including a shadow stack enforcement identifier 119 (referred to hereinafter as enforcement identifier 119). In embodiments, the enforcement identifier 119 determines whether or not the module identified in act 303 has shadow stack enforcement enabled. For example, referring to module 202, the enforcement identifier 119 would determine that module 202 does not have shadow stack enforcement enabled (i.e., because there is no check mark in the header 202*a* of module 202).

As discussed in connection with FIG. 2A, it is possible that a binary was compiled with support for shadow stacks (i.e., the binary is shadow stacks aware/compliant), but without a request for shadow stack enforcement (i.e., the binary has not opted-in to shadow stack enforcement). Thus, in some embodiments of act 304, the enforcement identifier 119 determines one or more of (i) whether or not the module was compiled with support for shadow stacks, or (ii) whether or not the module opted-in to shadow stack enforcement. In some embodiments, an external module is enabled for shadow stack enforcement when (i) the external module is compiled for shadow stack compliance (i.e., if there is no option to opt-in or opt-out), or (ii) when the external module is compiled to opt-in to shadow stack enforcement (i.e., if there is an option to opt-in or opt-out). Similarly, in some embodiments, an external module is not enabled for shadow stack enforcement when the external module is not compiled for shadow stack appliance (i.e., if there is no option to opt-in or opt-out), or (ii) when the external module is compiled to opt-out of shadow stack enforcement (i.e., if there is an option to opt-in or opt-out).

In some embodiments, the enforcement identifier 119 consults the header of the module identified in act 303 to determine whether or not the module is enabled for shadow stack enforcement. However, as discussed, in some embodiments act 301 comprises storing a record of whether or not the external module is enabled for shadow stack enforcement in connection with initiating execution of the thread. In these embodiments, determining whether or not the external module is enabled shadow stack enforcement can comprise the enforcement identifier 119 consulting this record, rather than needing to actually look at the module header itself.

In some embodiments, act 302 also comprises an act of 305 of identifying an enforcement rule for the module. In some embodiments, act 305 comprises identifying a rule based at least on an identity of the external module. For example, the exception handler 117 is shown as including a rule identifier 120. In embodiments, the rule identifier 120 consults rules 111 to determine if there exists a rule that specifies whether the exception should be permitted for the external module (i.e., in which case the thread should be permitted to continue executing), or whether the exception for should be disallowed for the external module (i.e., in which case the thread should be terminated). In embodiments, rules 111 are created based on analysis of prior logging (i.e., by logger 122) of shadow stack violations involving the external module at computer system 101 and/or at another computer system. In embodiments, the rule identifier 120 identifies a rule further based an identity of the application binary (i.e., in addition to an identity of the external module). Thus, in some embodiments the rules 111 are specific to a particular combination of application binary and external module.

Act 302 also comprises an act of 306 of enforcing a shadow stack violation policy for the module. In some embodiments, act 306 comprises, based on having determined whether the external module is enabled for shadow stack enforcement, performing one of terminating the thread (i.e., act 306*a*) or permitting the thread to continue executing (i.e., act 306*b*). For example, the exception handler 117 is shown as including a shadow stack policy enforcer 121 (referred to hereinafter as policy enforcer 121). In embodiments, the policy enforcer 121 either terminates the thread or permits the thread to continue executing depending on whether or not shadow stack enforcement is enabled for the external module, whether or not a rule identified in act 305 specifies that shadow stack violations should be permitted, and/or whether or not an enforcement mode or an audit mode is enabled.

As shown, act 306 can invoke act 306*a* to terminate the thread based at least on (i) shadow stack enforcement being enabled for the module, or (ii) shadow stack enforcement not being enabled for the module but a rule (i.e., accessed in act 305) specifies that the shadow stack violation should not be permitted. For example, if shadow stack enforcement is enabled for the module, then the module has requested that shadow stack violations by the module be enforced, the policy enforcer 121 terminates the thread, i.e., shadow stack violation is strictly enforced. If, on the other hand, shadow stack enforcement is not enabled for the module, then the policy enforcer 121 can default to permitting the thread to continue executing but override that default if a rule so specifies; thus, the module may not be compiled for shadow stack compliance (or may opt-out of shadow stack enforcement), but the policy enforcer 121 may nonetheless enforce shadow stack violations by the module.

On the other hand, and as shown, act 306 can invoke act 306*b* to permit the thread to continue executing based at least on (i) shadow stack enforcement not being enabled for the module (and there are no rules for the module), or (ii) shadow stack enforcement not being enabled for the module and a rule specifies that the shadow stack violation should be permitted. For example, if shadow stack enforcement is not enabled for the module, then the policy enforcer 121 can default to permitting the thread to continue executing. In addition, a rule (i.e., rules 111) could further specify that shadow stack violations should be permitted for the module. Thus, in some embodiments of act 306*a*, the computer system permits the thread to continue executing when the external module is not enabled for shadow stack enforcement and when the rule specifies that a shadow stack violation should be permitted.

Act 306*a* also shows that the thread could be terminated based at least on enforcement mode being enabled, while act 306*b* also shows that the thread could be permitted to continue executing based at least on audit mode being enabled. In embodiments, the policy enforcer 121 operates in either an enforcement mode or an audit modeeither globally, or on a per-thread, per-application binary, and/or per-module basis. When operating in enforcement mode, the policy enforcer 121 terminates a thread, or permits it to execute, based on the policies already described in connection with acts 306*a* and 306*b*. When operating in audit mode, on the other hand, the policy enforcer 121 permits a thread to continue executing even in cases where it would normally be terminated under the polices described in connection with act 306*a*. When combined with logging by the logger 122, audit mode is useful for logging shadow stack violations by executing code (whether that be code within a primary application binary and/or within an external module called by that application binary) without actually terminating a thread when a violation occurs.

Method 300 also comprises an act of 307 of logging the exception. For example, the logger 122 can log one or more data items about the exception into logs 112. In embodiments, act 307 is performed both when the policy enforcer 121 operates in enforcement mode and when it operates in audit mode, though it could be configured to refrain from logging in some situations. As examples, in various embodiments the logger 122 logs one or more of a calling site address, a target address, an identifier of the external module, an identifier of a process to which the thread belongs, an identifier of the thread, an identifier of an application binary, whether enforcement mode or audit mode is enabled, whether a shadow stack violation was enforced or permitted, etc. In embodiments, when logging an identifier of an external module or an application binary, logger 122 logs a filesystem path to the external module or the application binary. In some embodiments, the logger 122 preserves user privacy in these situations by removing or obfuscating personally identifiable information, such as a path portion corresponding to a user's home or profile directory.

As mentioned, the rule generator 123 (if present) processes logs 112, and/or sends logs 112 to a remote system for processing, in order to generate and/or receive rules 111 that are usable by the exception handler 117. As also mentioned, the rule identifier 120 (if present) consults these rules 111 to determine if an exception should be permitted for an external module based on an identity of the external module, potentially in combination with an identity of the application binary. The rule generator 123 (together with any remote system(s) involved) can use a vast variety of techniques to process logs 112 in order to generate rules 111, including the use of any appropriate machine learning techniques. In embodiments, the rule generator 123 can generate rules based on identifying modules that frequently (or infrequently) cause shadow stack violations, identifying application/module combinations frequently (or infrequently) shadow stack violations, identifying situations in which an allowed shadow stack violation later caused a thread to crash, identifying situations in suspicious behavior was observed after an allowed shadow stack violation, etc.

Accordingly, the embodiments herein enforce shadow stack violations at module granularity, rather than at the granularity of an entire thread (or process). Thus, rather than simply terminating a thread/process when a shadow stack violation is detected on the thread's stack, the embodiments herein perform checks to determine if the shadow stack violation occurred during execution of an external module, and if so, whether or not shadow stack enforcement is enabled for that module. If the shadow stack violation occurred during execution of a module, and if shadow stack enforcement is enabled for that module, embodiments proceed to terminate the thread (or the process to which it belongs). However, if shadow stack enforcement is not enabled for that module, some embodiments choose to permit the thread to continue executing, rather than terminating it as would be typical. Enforcement of shadow stack violations at module granularity, rather than at thread/process granularity, can increase overall security in a computer system, as well as increase the adoption of shadow stack technologies. For example, rather than needing to disable shadow stack enforcement on this application due to its interaction with modules that trigger shadow stack violations, the embodiments herein enforce shadow stack violations for the application's code, while permitting shadow stack violations by called module code. In this way, shadow stack enforcement can be enabled for an application even if it calls external modules that intentionally tamper with return addresses or that are not yet shadow stack compatible. Thus, the embodiments herein enable the use of shadow stack enforcement for an application—even in situations where it was previously impractical due to the module(s) upon which the application relies, or due to the environment in which the application executes.

Additionally, as discussed with respect to FIG. 4, for applications that are identified as requesting ability to enforce shadow stacks for dynamically generated code (e.g., via the presence, or lack, of certain binary header flags), embodiments described herein also facilitate shadow stack violation enforcements of that dynamic code by enabling the application to specify one or more memory ranges that store the dynamically generated code, and by enforcing shadow stack violations that occur within the specified memory ranges.

FIG. 5 illustrates a flowchart of an example method 500 for enforcing a shadow stack violation for dynamic code. Method 500 includes an act 510 of initiating execution of a thread at a processor. In embodiments, act 510 of initiating execution of the thread comprises an act 512 of generating a portion of dynamic code for execution by the thread. In some embodiments, the generating the portion of dynamic code for execution by the thread comprises just-in-time compiling source code, intermediate language code, and the like. In some embodiments, the thread uses a JavaScript, .NET, Python, or the like just-in-time compiler to generate the portion of dynamic code. Further, act 510 also comprises an act 514 of identifying a range of memory addresses where the portion of dynamic code is loaded and an act 516 of initiating execution of the portion of dynamic code. In embodiments, act 514 of identifying the range of memory addresses where the portion of dynamic code is loaded comprises calling an API, such as one corresponding to the code memory range receiver 416, to notify the operating system 400 of the range of memory addresses.

The method 500 also includes an act 520 of processing a shadow stack exception based on the execution of the thread. In embodiments, act 520 comprises an act 522 of determining that an exception is triggered. In some embodiments, act 522 further comprises determining that the exception resulted from the execution of the portion of dynamic code. As mentioned, in embodiments components of FIGS. 18 and 4 may be combined. In these embodiments, similar to act 303 of FIG. 3, the module identifier 118 may operate to perform one or more of (i) determining an identity of the portion of dynamic code that triggered the exception, (ii) identifying a memory address corresponding to a "calling site" of an instruction that triggered the exception, or (iii) identifying a memory address corresponding to a memory address that was the "target address" of the instruction that triggered the exception.

Act 520 also comprises an act 524 of determining whether an address of the exception is within the range of addresses where the portion of dynamic code is loaded. In some embodiments, an address obtained from the shadow stack is deemed as the address of the exception, though in some embodiments it may be possible to deem a return address obtained from the call stack as the address of the exception. As shown, act 524 includes determining whether the address of the exception is within the range of addresses where the portion of executable code that is marked to be protected via shadow stacks. Based on at least the determination that the address of the exception is within the range of addresses, an act 526 of initiating a shadow stack enforcement action is performed by the enforcer 424.

Notably, although not shown in FIG. 5, it is possible that the address of the exception is not within the range of addresses where the portion of executable code that is marked to be protected via shadow stacks. For example, if an exception occurred during execution of dynamic code for which there was no call to the code memory range receiver 416, then act 525 would determine that the address of the exception is not within the range of addresses where the portion of dynamic code is loaded. In this case, method 500 exits without having the enforcer 424 initiate a shadow stack enforcement action.

In some embodiments, act 526 of initiating the shadow stack enforcement includes at least one of terminating the execution of the thread or logging data associated with the exception. Alternatively, or in addition, act 526 of initiating the shadow stack enforcement may be based on additional factors. For example, the exception handler 420 might proceed to handle the shadow stack violation by permitting the thread to continue executing if an audit mode is enabled or if an enforcement mode is not enabled, as the exception handler 117 described earlier in connection with act 306. In embodiments, initiating the shadow stack enforcement action also includes identifying a rule based at least on an identity of the portion of dynamic code, in which case the enforcer 424 permits the thread to continue executing when the rule specifies that a shadow stack violation should be permitted, or terminates the thread when the rule specifies that a shadow stack violation should not be permitted.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:
1. A computer system comprising:
   a processor; and
   a computer-readable medium having stored thereon computer-executable instructions that are executable by the processor to cause the computer system to enforce a shadow stack violation during execution of dynamic code, the computer-executable instructions including instructions that are executable by the processor to cause the computer system to perform at least the following:
      initiate execution of a thread at the processor, execution of the thread including (i) generating a portion of dynamic code for execution by the thread, (ii) identifying a range of memory addresses where the portion of dynamic code is loaded in memory, and (iii) initiating execution of the portion of dynamic code;

based at least on execution of the thread at the processor, process an exception triggered by a mismatch between a first return address popped from a call stack corresponding to the thread and a second return address popped from a shadow stack corresponding to the thread, including:

determining whether or not the second return address popped from the shadow stack is within the identified range of addresses where the portion of dynamic code is loaded; and based on having determined that the second return address is within the range of addresses, initiating a shadow stack enforcement action.

2. The computer system of claim 1, wherein initiating the shadow stack enforcement action includes at least one of: (1) terminating the execution of the thread, or (2) logging data associated with the exception.

3. The computer system of claim 1, wherein generating the portion of dynamic code for execution by the thread comprises just-in-time compiling at least one of source code or intermediate language code.

4. The computer system of claim 1, wherein the thread uses a JavaScript just-in-time compiler to generate the portion of dynamic code.

5. The computer system of claim 1, wherein the computer-executable instructions also include instructions that are executable by the processor to cause the computer system to determine that an enforcement mode is enabled, and wherein initiating the shadow stack enforcement action comprises terminating execution of the thread.

6. The computer system of claim 1, wherein the computer-executable instructions also include instructions that are executable by the processor to cause the computer system to determine that an enforcement mode is not enabled, and wherein initiating the shadow stack enforcement action comprises permitting the thread to continue executing.

7. The computer system of claim 1, wherein the thread is only allowed to identify the range of memory addresses where the portion of dynamic code is loaded in memory when a binary image from which the thread executes (i) has strict shadow stack violation enforcement disabled, and (ii) has an identity that matches a rule.

8. The computer system of claim 1, wherein initiating the shadow stack enforcement action includes logging at least one of,
an identification of the portion of dynamic code,
an identifier of a process to which the thread belongs,
an identifier of the thread,
that an audit mode is enabled, or
that an enforcement mode is enabled.

9. The computer system of claim 8, wherein initiating the shadow stack enforcement action also includes determining whether an audit mode is enabled, and as a result of audit mode being enabled, logging at least one of,
the identification of the portion of dynamic code,
the identifier of the process to which the thread belongs,
the identifier of the thread,
that the audit mode is enabled, or
that the enforcement mode is enabled.

10. The computer system of claim 1, wherein initiating the shadow stack enforcement action also includes identifying a rule based at least on an identity of the portion of dynamic code, and wherein the computer system permits the thread to continue executing when the rule specifies that a shadow stack violation should be permitted.

11. A method, implemented at a computer system that includes a processor, for enforcing a shadow stack violation during execution of dynamic code, the method comprising:

initiating execution of a thread at the processor, execution of the thread including (i) generating a portion of dynamic code for execution by the thread, (ii) identifying a range of memory addresses where the portion of dynamic code is loaded in memory, and (iii) initiating execution of the portion of dynamic code;

based at least on execution of the thread at the processor, processing an exception triggered by a mismatch between a first return address popped from a call stack corresponding to the thread and a second return address popped from a shadow stack corresponding to the thread, including:

determining whether or not the second return address popped from the shadow stack is within the identified range of addresses where the portion of dynamic code is loaded; and based on having determined that the second return address is within the range of addresses, initiating a shadow stack enforcement action.

12. The method of claim 11, wherein initiating the shadow stack enforcement action includes at least one of: (1) terminating the execution of the thread, or (2) logging data associated with the exception.

13. The method of claim 11, wherein generating the portion of dynamic code for execution by the thread comprises just-in-time compiling at least one of source code or intermediate language code.

14. The method of claim 11, wherein the thread uses a JavaScript just-in-time compiler to generate the portion of dynamic code.

15. The method of claim 11, further comprising determining that an enforcement mode is enabled, and wherein initiating the shadow stack enforcement action comprises terminating execution of the thread.

16. The method of claim 11, further comprising determining that an enforcement mode is not enabled, and wherein initiating the shadow stack enforcement action comprises permitting the thread to continue executing.

17. The method of claim 11, wherein initiating the shadow stack enforcement action includes logging at least one of,
an identification of the portion of dynamic code,
an identifier of a process to which the thread belongs,
an identifier of the thread,
that an audit mode is enabled, or
that an enforcement mode is enabled.

18. The method of claim 17, wherein initiating the shadow stack enforcement action also includes determining whether an audit mode is enabled, and as a result of audit mode being enabled, logging at least one of,
the identification of the portion of dynamic code,
the identifier of the process to which the thread belongs,
the identifier of the thread,
that the audit mode is enabled, or
that the enforcement mode is enabled.

19. The method of claim 11, wherein initiating the shadow stack enforcement action also includes identifying a rule based at least on an identity of the portion of dynamic code, and wherein the computer system permits the thread to continue executing when the rule specifies that a shadow stack violation should be permitted.

20. A computer program product comprising one or more hardware storage devices having stored thereon computer-executable instructions that are structured such that, when executed by one or more processors of a computing system, the computer-executable instructions cause the computer system to perform at least the following:

initiate execution of a thread at the processor, execution of the thread including (i) generating a portion of dynamic code for execution by the thread, (ii) identifying a range of memory addresses where the portion of dynamic code is loaded in memory, and (iii) initiating execution of the portion of dynamic code;

based at least on execution of the thread at the processor, process an exception triggered by a mismatch between a first return address popped from a call stack corresponding to the thread and a second return address popped from a shadow stack corresponding to the thread, including:

determining whether or not the second return address popped from the shadow stack is within the identified range of addresses where the portion of dynamic code is loaded; and based on having determined that the second return address is within the range of addresses, initiating a shadow stack enforcement action.

\* \* \* \* \*